United States Patent [19]
Seth

[11] 3,892,538
[45] July 1, 1975

[54] METHOD AND APPARATUS FOR GENERATING HIGH TEMPERATURE ZONE USING FIXED-FLUIDIZED BED

[76] Inventor: Ram Gopal Seth, 1112 Yardley Rd., Cherry Hill, N.J. 08034

[22] Filed: Feb. 28, 1973

[21] Appl. No.: 336,408

[52] U.S. Cl. ............... 23/295; 23/277 R; 23/308 R; 432/15; 423/659 F; 75/26
[51] Int. Cl. .................... F27b 15/00; B01d 9/00
[58] Field of Search ............ 23/277 R, 288 S, 308 R, 23/308 S, 295, 293 A, 293 R; 259/DIG. 17; 432/15, 58; 423/325, 659 F; 34/10, 57 A; 65/134; 75/26

[56] References Cited
UNITED STATES PATENTS

| | | | |
|---|---|---|---|
| 2,546,570 | 3/1951 | Vance | 23/288 S |
| 3,261,661 | 7/1966 | Javorsky et al. | 34/10 |
| 3,427,008 | 2/1969 | Geoffroy | 432/15 |
| 3,511,487 | 5/1970 | Desty | 34/10 X |

FOREIGN PATENTS OR APPLICATIONS
| | | | |
|---|---|---|---|
| 1,045,894 | 10/1966 | United Kingdom | 432/15 |

*Primary Examiner*—Morris O. Wolk
*Assistant Examiner*—Timothy W. Hagan
*Attorney, Agent, or Firm*—Charles F. Duffield

[57] ABSTRACT

Method and apparatus for generating high temperatures within a controlled zone by utilizing a fixed-fluidized bed which employs larger fixed particles incapable of fluidization disposed in the lower region of a bed of smaller particles capable of fluidization. A combustible gas mixture is burned within the bed and passed through the bed at a superficial velocity at or slightly below the minimum fluidization velocity of the smaller fluidized particles. The larger fixed particles stabilize the fluidization of the bed and permit the combustion of the gases to be localized within a small high temperature zone at the top of the fluidized bed.

3 Claims, 1 Drawing Figure

PATENTED JUL 1 1975　　3,892,538
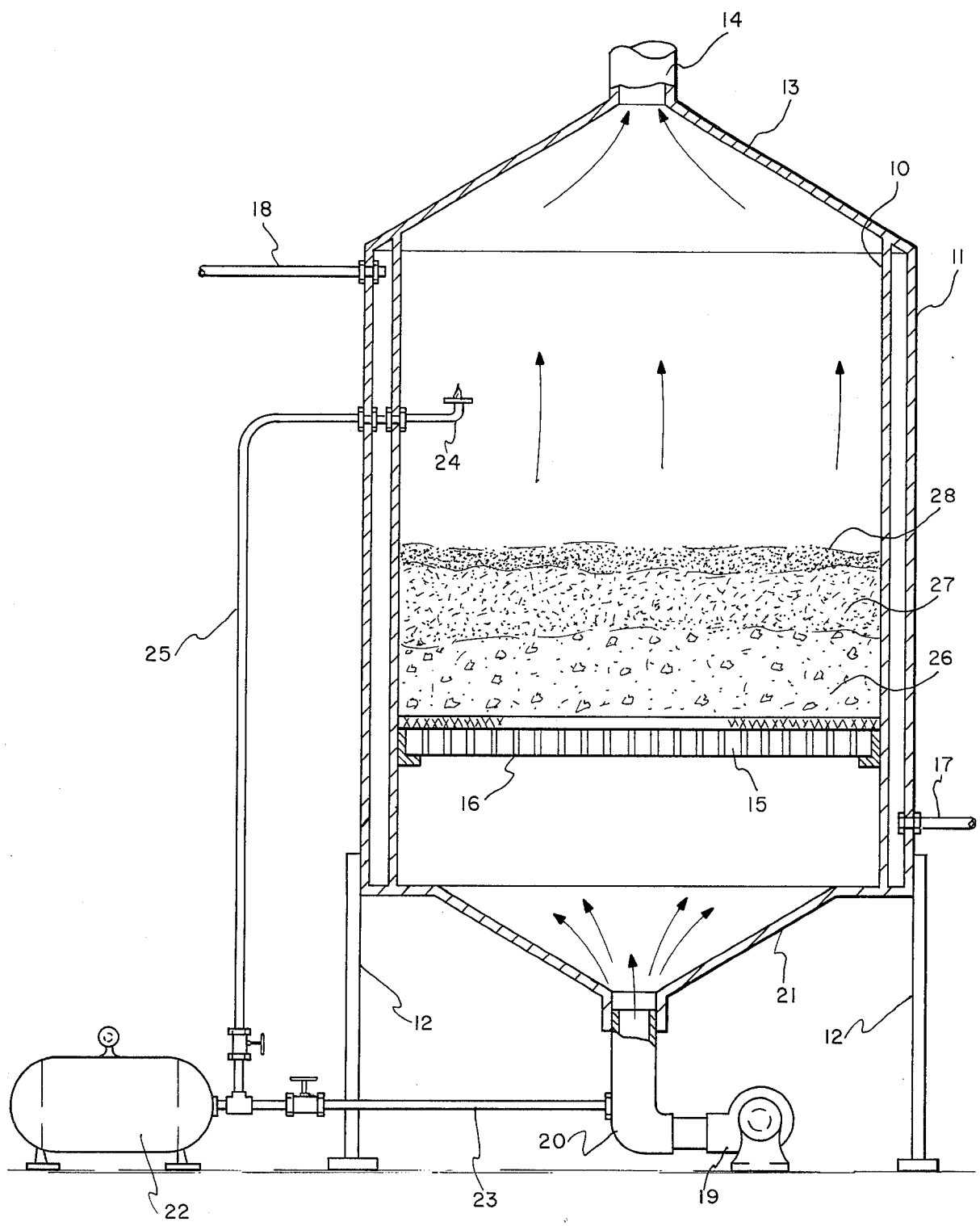

METHOD AND APPARATUS FOR GENERATING HIGH TEMPERATURE ZONE USING FIXED-FLUIDIZED BED

BACKGROUND OF INVENTION

High temperature furnaces are required in many processes such as for processing magnesium tungsten, tantalum and for the creation of other products such as cristobalite. High temperature furnaces are of different designs and work upon different principles but all such designs involve various definite temperature and/or economic limitations.

One form of high temperature furnace is the type which involves an exothermic reaction. Furnaces of this nature can generate very high temperatures, however, the reaction must involve a chemical reaction with the charge and this type of furnace can only be used in those processes in which the end product of the exothermic reaction is that sought.

Increased temperatures can be obtained in conventional types of furnaces by increasing the oxidizing component or by increased fuel consumption. However, the ultimate temperatures obtainable are generally limited by the flame temperature of the fuel and the heat transfer is dependent upon convection and radiation. The increased use of oxygen accordingly increases the process cost.

Furnaces employing electricity, such as arc furnaces or induction furnaces, are capable of generating reasonably high temperatures. However, the operation of such furnaces is extremely costly. Additionally, the control of the dissipation of heat energy or the area to which such heat energy can be extended becomes limited.

A further form of furnace is that in which the charge to be heated is brought into direct contact with the flame. In furnaces of this type, problems are experienced in maintaining stability of the fuel consumption and positioning of the flame in respect to the charge.

One example of a direct flame contact type of furnace which has been experimentally tried is that employing a fluidized bed. In the experimental furnace, the charge to be heated was of a small enough particle size to be fluidized. A combustible gas was passed through the charge at a superficial velocity to completely fluidize the entire bed and the gas was burned within the bed to create a direct contact of the flame with the material. Such an experimental apparatus was commercially unsuccessful in that the column of fluidized material was extremely unstable and the combustion of the gases and contact of the flame with the material erratic. Accordingly, no significantly high temperatures were obtained.

OBJECT AND SUMMARY OF INVENTION

It is the object of the present invention to provide improvments to direct flame contact furnaces of the fluidized type which will introduce stability to the fluidization of the charge to be heated and provide a controlled defined zone of combustion of the gases in which extremely high temperatures are generated.

The process and apparatus of the present invention accomplishes the foregoing object by the provision and the utilization of larger unfluidized particles disposed within the lower region of the fluidized bed. The gases to be burned within the fluidized bed are passed through the bed at a superficial velocity at or slightly below the minimum fluidization velocity of the particles. The larger particles stabilize the fluidization of the smaller particles and the selected superficial velocity results in the creation of a well defined combustion zone at the top of the fluidized bed within which extremely high temperatures are generated which are in the neighborhood of the theoretical flame temperature of the gases being burned.

Other objects and advantages of the present invention will become apparent to those skilled in the art from the detailed description of the invention which follows taken in conjunction with the drawing.

DESCRIPTION OF DRAWING

The drawing is a side view, partially in section, of a furnace illustrating the structure and process of the invention.

DESCRIPTION OF INVENTION

A typical structure for employing the present invention is shown in FIG. 1 of the drawing. The furnace includes an inner and outer wall 10 and 11 respectively which, in the embodiment shown, are cojoined and cylindrical in form. The walls 10 and 11 are supported upon supporting legs 12, as shown. A conical hood 13 and discharge duct 14 are disposed centrally thereof and enclose the top portion of the furnace.

A distributor plate 15 is positioned in the lower portion of the furnace and serves to diffuse and distribute gases passing upwardly through the furnace. A retention screen 16 is disposed immediately above and supported by the distributor plate 15 and serves to retain the fine particles of the charge from passing downwardly through the furnace.

The void between the inner and outer walls, 10 and 11 respectively, is designed to be filled and cooled with a liquid such as water. An inlet pipe 17 is provided for the entrance of the coolant. In a like manner, an exit line 18 is provided at the top portion of the cooling jacket for discharge of the coolant.

A fan blower 19 is disposed beneath the furnace. The blower 19 discharges through a duct 20 to a discharge plenum 21 beneath the distributor plate 15.

A source of combustible gas, such as propane, is provided by means such as tank 22. The propane is delivered through a conduit 23 to the discharge duct 20 for mixing with the air being delivered by the blower. A pilot light 24 is positioned above the charge in the furnace and is supplied through a supply lines 25 from the gas tank 22.

In accordance with the invention, a mass of large particles 26 are disposed in the bottom of the furnace and are supported by the screen 16. The large particles may be of various types of gravel or rock or any other inert material and are of size such that they will not be fluidized. A second mass of smaller particles 27 is disposed throughout the interstices of the larger particles and also extends above the bed of larger particles at a predetermined distance to define a free bed. The smaller particles may be sand, silica, or any other charge and are of a particle size capable of being fluidized by the gases passing through the furnace.

Generally, in accordance with the invention, the combustible gas from the supply tank is mixed with the air from the blower and is passed through the distributor plate 15 upwardly through the mass of fixed fluidized particles. The pilot light 24 ignites the gases and causes the gases to burn within the upper portion of the bed of fluidized particles. The fixed particles 26, in the lower region of the bed, stabilize the gases passing through the fluidized particles and enhances the stability of the combustion in the top zone of the fluidized bed. As explained in more detail hereinafter, the superficial velocity of the gases passing through the bed is adjusted to the point of minimum fluidization or slightly below that point with the result that the zone of combustion is maintained within a well defined zone 28 in the top region of the fluidized bed.

The operation of the furnace shown in FIG. 1 of the drawing and the ultimate maximum temperature obtainable in the high temperature zone 28 is dependent upon the adjustment of numerous variables. One of the variables is the properties of the fluidizing gas. The different combustible mixtures will have different calorific value. Accordingly, the theoretical flame temperature obtainable with the fuel will vary with the different combustible mixtures employed. Additionally, dependent on the other variables, the higher the temperature obtained in the combustion zone, the more efficient burning occurs with an ultimate higher temperature. Such fuels as propane burned with an air to fuel mixture volumetric ratio from 7:1 to 3.75:1 have been found satisfactory for use.

Another variable is the properties of the fluidizing materials. The thermal conductivity, specific heat and radiative emissivity of the fluidized particles will affect the maximum obtainable temperature inside the system. Particles of a high thermal conductivity will favor a more uniform distribution of the heat downward from the combustion zone into the lower particles and will thus detract from the ultimate temperature obtainable in the combustion zone. A lower specific heat of the particles will lead to quicker heating of the material within the zone and will thus result in higher temperature generation within the zone. Particles of higher radiant emissivity will result in greater radiation losses from the system resulting in lowering of the ultimate temperature within the combustion zone.

The design of the bed is a further variable within the furnace. The ratio of the mass of the fixed and fluidized particles in the bed determines the stability and pressure drop across the bed. A higher ratio of fixed particles will resist the tendency of defluidization in the system, reduce the entrainment loss, lead to better mixing of the fluidizing gases and generally improve the quality of fluidization in the smaller particles. The superficial velocity through the bed is determined by the size of the fluidized particles. Accordingly, increasing the size of the particles will increase the total input of the fluidizing media, consequently the proportionate stoichiometric fraction of the combustible gases is increased.

A further and very important variable is the superficial velocity of the gases through the bed. The dynamics of fluidization of particles are such that the pressure drop through the bed increases continuously from zero to a point known as the point of minimum fluidization. At the point of minimum fluidization, there are no bubbles in the bed. However, on slightly increasing the superficial velocity, bubbles start appearing in the bed and the variation in pressure drop, as a function of the superficial velocity, remains more or less constant thereafter regardless of the degree of fluidization. In accordance with the invention, the superficial velocity chosen is at the point of minimum fluidization or slightly below that point.

As above stated, the superficial velocity for minimum fluidization varies in accordance with the particle size and also with the mixture of the various particle sizes. Set out below in Table No. 1 is a chart showing the required superficial velocity for minimum fluidization for various particle sizes and mixtures thereof.

Table 1

VARIATION IN SUPERFICIAL VELOCITY FOR VARYING RATIOS OF PARTICLE SIZE MIXTURES

| Percentage Particle Size | | Minimum fluidization (Velocity, fps) |
|---|---|---|
| 35 Mesh | 48 Mesh | |
| 100.0 | 0.0 | 0.52 |
| 90. | 10. | 0.475 |
| 50. | 50.0 | 0.351 |
| 10. | 90.0 | 0.278 |
| 0. | 100.0 | 0.248 |

| Percentage Particle Size | | Minimum Fluidization (Velocity, fps) |
|---|---|---|
| 35 Mesh | 65 Mesh | |
| 100.0 | 0.0 | 0.52 |
| 90.0 | 10.0 | 0.425 |
| 50.0 | 50.0 | 0.278 |
| 10.0 | 90.0 | 0.150 |
| 0.0 | 100.0 | 0.127 |

Further variables determining the ultimate temperature in the combustion zone are heat losses occasioned by heat loss to the fluidizing media and heat loss due to emissive radiation.

As respects heat loss to the fluidizing media, the cold fluidizing gases in passing through the bed are liberating the heat of combustion. However, due to high content of nitrogen in the gases and the small period of contact of the fluidizing gases with the high temperature zone, the outgoing gases are not heated to the temperature of the bed. The total amount of heat taken by the outgoing gases is determined by several variables including the input temperature of the gases, the time period of contact with the hot part of the bed and the temperature of the bed. An evaluation of such heat loss to the fluidizing medium can be calculated by the use of appropriate formulas which are known to those skilled in the art and, therefore, a detailed description is not thought necessasry for the purpose of this disclosure.

The factor of heat loss due to emissive radiation is also limiting in the utlimate temperature obtainable in the bed. This heat loss depends upon the emissivity of the particular particles concerned as well as their temperature. The emissive radiation losses can be calculated by well known formulas known to those skilled in the art and, therefore, a detailed description of such a calculation is not deemed necessary to the purposes of the disclosure.

A further significant variable, which must be taken into account in the furnace according to the present invention, is the phase change in the solid particles being fluidized. As the phase change occurs from the solid to the liquid, the latent heat of fusion will become such a heat sink for the heat of combustion that the maximum temperature obtainable will be limited by the phase change temperature of the fluidized particles.

The overall operation and performance of the furnace can be adjusted and affected by variation of the above referred to variables. In general, the purpose of the fixed particles is elimination of pressure fluctuation at the distributor plate due to random generation of bubbles in the fluidized bed system. This overcomes the problem in conventional fluidized beds wherein the velocity profile at the onset of fluidization before the distributor plate is hyperbolic in nature thus resulting in the bed being not uniformly lifted at the point of minimum fluidization. The presence of the fixed particles at the top of the distributor plate helps in uniformly distributing the air flow thus leading to a uniform expansion of the bed across its cross section.

Once the fixed and fluidized particle size has been chosen, the velocity of the combustible gases is adjusted at or just below the point of minimum fluidization of the fluidized particles. At a point just below the minimum fluidization velocity, the combustion of the fluidizing gases occurs at the top of the bed. The bed is not lifted enough at the point below minimum fluidization to permit any significant mixing of the particles inside the furnace. By reason of the relative stability of the bed, the temperature of the top layer of the bed is not lowered or distributed downwardly through the remainder of the mass of the particles. Hence, except for the heat loss to the outgoing gases and the radiative mechanism, all of the heat is retained on the surface of the bed. In this manner, a well defined zone of extremely high temperature occurs in the top region of the bed.

The combustion zone at the top portion of the fluidized bed can be varied in height and, accordingly, temperature, by variation of the many variables. It is thus possible to regulate the temperature inside the bed by changing the mass flow rate of the fluidizing gases, by changing the dimensions of the bed and/or the particle composition and size within the bed. In general, as the superficial velocity is increased toward greater fluidization, the depth of the zone will increase with a consequent decrease in temperature by reason of the convective mixing of the particles resulting from incipient fluidization.

In applications where it is desirable that the particles in the combustion zone be melted, this can be accomplished by adjusting the variables such that the melting temperature of the particles will be obtained and holding the conditions stable until the particles are melted. Generally, the particles, upon melting, will separate and part from the bed moving to the outside of the furnace. As this occurs, additional particles will be exposed and the combustion zone will move downwardly to the exposed particles thus resulting in their melting in a continuous process.

Complete heat treatment of the entire fluidizing mass is possible in the system by utilization of a cyclically varying pressure variation device. Such apparatus will, periodically, increase the superficial velocity of the gases through the furnace to a point beyond minimum fluidization to cause mixing of the materials. Therafter, the fluidization velocity is returned to the minimum fluidization velocity at which the high temperature zone is reestablished to treat the materials within that zone. The cycle can be repeated until all of the material within the furnace has been heat treated at the high temperatures within the various zones as they are established.

From the foregoing, it will be appreciated that it is possible to generate high temperatures in the fixed-fluidized bed system by reason of the conservation of energy within the combustion zone. The temperatures which are generated will, unlike conventional methods of generating high temperatures in like furnaces and units, be in the neighborhood of the maximum theoretical flame temperature of the burning gases. The maximum temperature in the furnace is essentially limited by the phase transformation temperature of the fluidized mass in which the combustion is taking place.

The apparatus and method of the present invention, for generating high temperatures in a defined zone, can be used for processing any material requiring exposure to high temperatures such as the treatment of magnesium, tungsten and tantalum. The method can also be used in the manufacture of glass from a basic charge, iron from iron ore and in other such processes.

One specific application of the process and apparatus of the present invention is conversion of silicon dioxide (sand) into cristobalite. The silicon dioxide system has three distinct crystal informs, namely quartz, tridymite andn cristobalite. Tridymite and cristobalite are the high temperature forms of the sand. Quartz is converted into tridymite and cristobalite on prolonged heating after a temperature of 1,800° F. (980° C.). Tridymite is further converted into cristobalite on heating above 2,680° F. (1,470° C.). Tridymite and cristobalite, if cooled rapidly from the formation temperature, are stable phase transformations at ordinary temperature and pressure.

Ordinary quartz or tridymite, when exposed to prolonged heating between the range of 1,470° C. to 1,710° C., corresponding to the melting point of cristobalite, will transform into cristobalite. The rate of transformation into cristobalite is a function of temperature and time. The conversion time at/or slightly above the lower range of 1,470° C. is approximately 16 hours whereas the transformation time at the upper range of 1,700° C. is but 18 minutes.

The value of cristobalite is due to its superior thermal characteristics over quartz. Quartz experiences a sudden expansion in the temperature range of between 950° F. to 1,150° F. and gradual expansion beyond 2,000° F. This expansion results in thermal cycling of the structures and are undesirable. Cristobalite, on the other hand, undergoes abrupt expansion at 430° F. beyond which thermal expansion becomes insignificant.

Silica refractory bricks in glass tanks and open hearths, by reason of the repeated cycling, experience structural deterioration and failure. Additionally, the use of silica in foundry practice lowers the quality of the surface finish of the material due to the expansion and deterioration of the material. Cristobalite, when used in place of silica in high temperature applications, improves both the structural integrity of the lining as well as the quality of the products by reason of the stability of the cristobalite material.

The apparatus and method of the present invention has been used in the conversion of sand into cristobalite. The furnace employed was one of 6 inches in diameter formed of stainless steel and utilized a water jacket for cooling of the outer walls of the furnace. The overall height of the furnace was 24 inches above the distributor plate.

The fixed bed utilized above the distributor plate was gravel of an average diameter of 1/2 inch and of a bed height of approximately 6 inches. The fluidized material was Ottawa sand varying from a −30 to +40 mesh size. The height of the bed from the distributor plate was 13 inches high including 7 inches above the top of the fixed gravel bed.

The fluidizing medium was a mixture of air and propane. The air to fuel mixture ratio on volumetric basis was approximately 5:1. The superficial velocity was adjusted to the point of minimum fluidization of the sand and was approximately 0.60 feet per second.

The propane passing through the fluidized bed was ignited and the flow rate of gases passing through the bed finally adjusted to obtain a glowing region or high temperature zone at the top of the bed. The thickness of the high temperature zone developed was in the range between 0.75 to 1.0 inches. The sand within the high temperature zone melted and moved to the side exposing new sand within less than one minute demonstrating the temperatures in the zone to be at or above 1,700° C. This represented a 35° F. per second rate of temperature rise in the high temperature zone. Heat balance calculations on the furnace revealed an efficiency of 52% heat dissipation into the high temperature zone and the sand below the zone. The calculations revealed 10% heat loss to the fluidizing medium and 38% heat loss due to emissive radiation. This represents an approximate 80% fuel savings over conventional methods.

The apparatus and process of the present invention for creating high temperature zones within a furnace has been described in respect to a particular embodiment of the apparatus and process. Having so described the apparatus and process, other variations and modifications to the invention will become apparent to those skilled in the art. Accordingly, no limitation as to the scope of the invention was intended by the description thereof in respect to the particular embodiments of the apparatus and process described.

I claim:

1. The method of generating high temperatures within a defined zone comprising the steps of:
   interdisbursing larger fixed particles within the lower region of a bed of smaller particles capable of fluidization; and
   passing and maintaining a combustible gas mixture through the bed at a steady state superficial velocity at or slightly below the minimum fluidization velocity of the smaller particles whereby, upon ignition of the gas mixture, the larger unfluidized particles will stabilize the incipient fluidization of the smaller particles and a high temperature zone of gas combustion will occur in the top zone of the bed of smaller particles.

2. The method of claim 1 further including the steps of:
   maintaining the flow of combustible gases through the bed at a superficial velocity at or slightly below the minimum fluidization velocity until melting of the smaller particles occurs;
   thereafter, increasing the flow of gas mixture through the bed to a superficial velocity in excess of the minimum fluidization velocity of the smaller particles to intermix the melted particles into the bed to expose new particles for subsequent melting; and
   thereafter, reestablishing the flow of gas mixture through the bed at a steady state superficial velocity at or slightly below the minimum fluidization velocity of the smaller particles to reestablish melting thereof in the top zone of the bed of smaller particles.

3. In a furnace including a bed of larger sized particles within the lower region of a bed of smaller particles capable of fluidization and means for passing and maintaining a combustible gas mixture through the beds of larger and smaller particles, the improvement in the method of operating the furnace comprising the step of regulating the velocity of the flow of gas at a steady state superficial velocity at or slightly below the minimum fluidization velocity of the smaller particles whereby, upon ignition of the gas mixture, the larger unfluidized particles will stabilize the incipient fluidization of the smaller particles and a high temperature zone of gas combustion will occur in the top zone of the bed of smaller particles.

* * * * *